United States Patent
Assefa et al.

(10) Patent No.: US 7,260,287 B2
(45) Date of Patent: Aug. 21, 2007

(54) NANO-ELECTROMECHANICAL HIGH-INDEX CONTRAST

(75) Inventors: Solomon Assefa, Addis Ababa (ET); Reginald E. Bryant, Cambridge, MA (US); Alexei A. Erchak, Cambridge, MA (US); Shanhui Fan, Palo Alto, CA (US); Erich P. Ippen, Belmont, MA (US); John D. Joannopoulos, Belmont, MA (US); Steven G. Johnson, Cambridge, MA (US); Leslie A. Kolodziejski, Belmont, MA (US); Elefterios Lidorikis, Arlington, MA (US); Gale S. Petrich, Arlington, MA (US); Michelle L. Povinelli, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/916,837

(22) Filed: Aug. 12, 2004

(65) Prior Publication Data

US 2005/0147344 A1 Jul. 7, 2005

Related U.S. Application Data

(60) Provisional application No. 60/494,612, filed on Aug. 12, 2003.

(51) Int. Cl.
G02B 6/26 (2006.01)
G02B 6/00 (2006.01)

(52) U.S. Cl. .......................................... 385/22; 385/25

(58) Field of Classification Search .............. 385/20–22, 385/25
See application file for complete search history.

(56) References Cited

U.S. PATENT DOCUMENTS

| | | | | |
|---|---|---|---|---|
| 5,367,584 A | * | 11/1994 | Ghezzo et al. | 385/17 |
| 6,351,578 B1 | * | 2/2002 | Brinkman et al. | 385/16 |
| 2002/0031305 A1 | | 3/2002 | Ticknor et al. | |

FOREIGN PATENT DOCUMENTS

WO    WO 00/72064    11/2000

OTHER PUBLICATIONS

"Micro-Mechanical Electrostatically Actuated Optic Switch for N×N Cross-Connect Array," Shubin et al. *Tuesday Morning. CLEO.* 2001.

"Electrostatically actuated 1×2 micro-mechanical optic switch," Shubin et al. *Electronics Letters.* Mar. 2001. vol. 37, No. 7.

"Optical MEMS Devices Based on Moving Waveguides," Ollier. *IEEE Journal on Selected Topics in Quantum Electronics.* Jan./Feb. 2002. vol. 8, No. 1.

(Continued)

*Primary Examiner*—Sung Pak
(74) *Attorney, Agent, or Firm*—Gauthier & Connors LLP

(57) ABSTRACT

A nano-electromechanical optical switch includes an input optical waveguide that is provided with an optical signal. At least two output optical waveguides are coupled to the input optical waveguide. The deflection of the input optical waveguide aligns with one of either of the two output optical waveguides so as to allow transmission of the optical signal to one of either of the two output optical waveguides.

6 Claims, 4 Drawing Sheets

OTHER PUBLICATIONS

"Planar Microoptomechanical Waveguide Switches," Bakke et al. *IEEE Journal on Selected Topics in Quantum Electronics*. Jan./Feb. 2002. vol. 8, No. 1.

"Spot-Size converter for low-loss coupling between 0.3-µm-square Si wire waveguides and single-mode fibers," Shoji et al. *IEEE*. 2002.

"Block-iterative frequency-domain methods for Maxwell's equations in a planewave basis," Johnson et al. *Optics Express*. Jan. 2001. vol. 8, No. 3.

"Photonic band-gap waveguide microcavities: monorails and air bridges," Lim et al. *J. Vac. Sci. Technol*. May/Jun. 1999. vol. 17.

"Calculating Electromagnetic force and energy using singularity functions," Inan et al. *IEEE*. 2002.

"M-Test: A test chip for MEMS Material Property Measurement Using Electrostatically Actuated Test Structures," Osterberg et al. *Journal of Microelectromechanical Systems*. Jun. 1997. vol. 6, No. 2.

"Generating Efficient Dynamical Models for Microelectromechanical Systems from a Few Finite-ELEMENT Simulation Runs," Hung et al. *IEEE Journal of Microelectromechanical Systems*. Sep. 1999. Vo. 8, No. 3.

"A High-Efficiency Out-of-Plane Fibre Coupler for Coupling to High Index Contrast Waveguides," Taillaert et al. *Proceedings of ECOC*. vol. 6,pp. 30-31 (Sep. 30, 2001).

"Design of a Nanoelectromechanical High-Index-Contrast Guided-Wave Optical Switch for Single-Mode Operation at 1.55µm," Povinelli et al. *IEEE Photonics Technology Letters*. vol. 15, n. 9 (Sep. 9, 2003).

* cited by examiner butt coupling parallel coupling

NANO-ELECTROMECHANICAL HIGH-INDEX CONTRAST

PRIORITY INFORMATION

This application claims priority from provisional application Ser. No. 60/494,612 filed Aug. 12, 2003, which is incorporated herein by reference in its entirety.

This invention was made with government support under Grant No. DMR-0213282 awarded by the NSF. The government has certain rights in the invention.

BACKGROUND OF THE INVENTION

The invention relates to the field of a nano-electromechanical optical switch, and in particular to a nano-electromechanical optical switch based on the horizontal deflection of an input waveguide to align with one of two output waveguides.

Progress toward the design of integrated optical circuits will require the incorporation of optical devices with a variety of functionalities on a single chip, such as waveguides, splitters, amplifiers, filters, and switches. High-index-contrast systems, such as GaAs—$Al_xO_y$ and InGaP—InGaAs, are promising platforms for integrated optics due to the potential for tight mode confinement, resulting in small device sizes. A design is proposed for a high-index-contrast nanoelectromechanical (NEMS) switch based on electrostatic actuation of a deflected planar waveguide, and theoretical calculations are presented to predict device performance. Previous work has demonstrated similar but larger microelectromechanical (MEMS)-type switches in several low-index-contrast systems: layered silicon oxynitride waveguides ($\Delta n=0.2$ between waveguide and cladding), Si—$SiO_2$ waveguides, silicon-on-insulator with postprocessed polymeric waveguides, and free-standing silica waveguides fabricated using silica-on-silicon technology.

SUMMARY OF THE INVENTION

According to one aspect of the invention, there is provided a nano-electromechanical optical switch. The nano-electromechanical optical switch includes an input optical waveguide that is provided with an optical signal. At least two output optical waveguides are coupled to the input optical waveguide. The deflection of the input optical waveguide aligns with one of either of the two output optical waveguides so as to allow transmission of the optical signal to one of either of the two output optical waveguides.

According to another aspect of the invention, there is provided a method of performing nano-scaled optical switching. The method includes providing an input optical waveguide that is provided with an optical signal. Furthermore, the method includes providing at least two output optical waveguides that are coupled to the input optical waveguide. The deflection of the input optical waveguide aligns with one of either of the two output optical waveguides so as to allow transmission of the optical signal to one of either of the two output optical waveguides.

According to one aspect of the invention, there is provided a cantilever-based optical switch. The cantilever-based optical switch includes an input optical waveguide that is provided with an optical signal. At least two output optical waveguides are coupled to the input optical waveguide. The deflection of the input optical waveguide aligns with one of either of the two output optical waveguides so as to allow transmission of the optical signal to one of either of the two output optical waveguides.

DETAILED DESCRIPTION OF THE INVENTION

The invention employs single-mode GaAs strip waveguides, which reduce the device dimensions in two ways. First, the cross-sectional area is reduced by up to a factor of 100 as compared to previous designs; second, the reduced area makes it possible to mechanically deform the waveguide over shorter distances, reducing the cantilever length by roughly a factor of ten. Such a dramatically reduced device size should allow for increased integration density and increased operation speeds.

The invention can be a 1×2 switch, in which the input waveguide functions as a cantilever beam that can be aligned with either of the output waveguides, by means of a voltage applied between the cantilever and a nearby electrode. Input and output waveguides reside on a low-index substrate with the switching cantilever region extending over a trench in the low-index material, $Al_xO_y$ (n=1.61). Current fabrication efforts are employing a process similar to that used to make the micromechanical air bridge. Further reduction of input-coupling losses can employ, e.g., inverse taper spot-size converters.

Figure 1A:
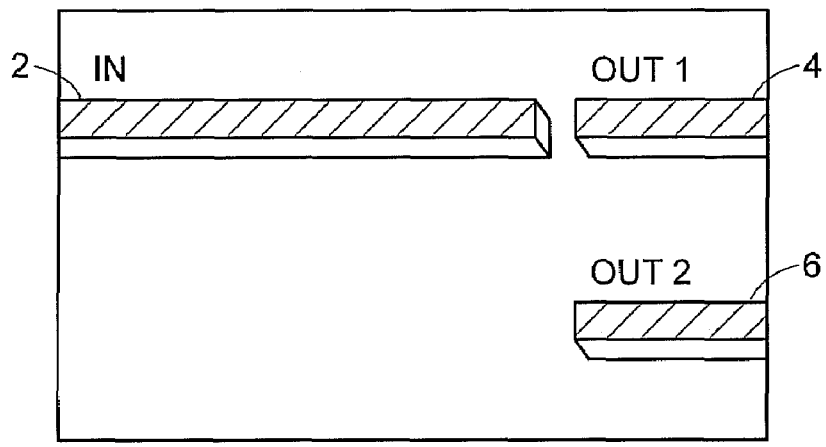
FIGS. 1A-1B are schematic diagrams demonstrating butt- and parallel-coupler designs.
Figure 1B:
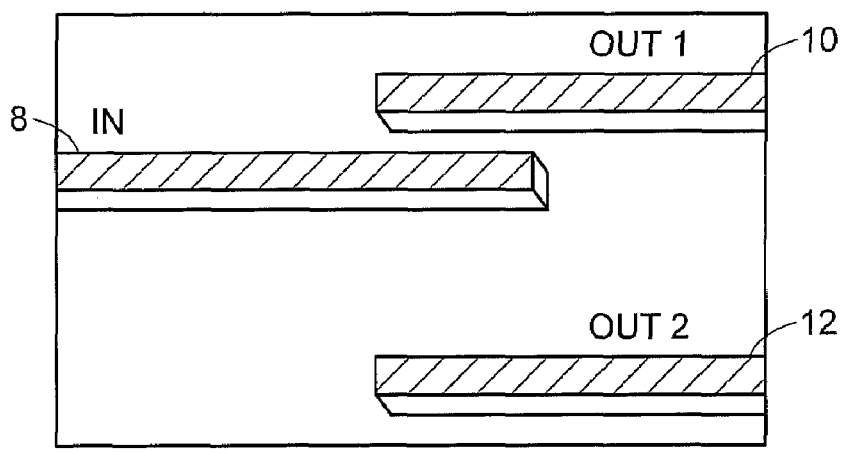

After using numerical simulations to show that the required operating voltage for such a device falls within an achievable range (<100 V for cantilever lengths greater than 10 μm), two different methods of achieving high optical transmission are explored, as depicted in FIGS. 1A-1B. In FIG. 1A, light is transmitted from an input waveguide 2 to a butt-coupled output waveguide 4 across a small air gap, yielding 80%-95% transmission for realistic values of the design parameters. In FIG. 1B, a parallel waveguide coupler is used. It is well known that in the limit of weak coupling, light can be completely transferred between two identical, parallel waveguides 8, 10. It is demonstrated that a high, polarization-independent transmission of >90% can be achieved in a high-index-contrast strongly coupled switch, as well as a single-polarization transmission of 98%. Further, a technique for determining the optimal design parameters of such a device is presented. Note output waveguides receive the deflected signal from the waveguides 6, 12.

The operating voltage of the switch will depend on several device characteristics, including the dimensions of the cantilever beam, the waveguide-electrode separation, and the required deflection distance. Waveguides with a square cross section are used to allow for polarization independence. The waveguide width (a) is chosen narrow enough to make the waveguide single mode at an operating wavelength of 1.55 µm; in this case, 280 nm. The separation distance between the cantilever waveguide and the (high-index) electrode should be large enough to make optical coupling negligible, 3a-6a (840 nm-1680 nm). The required deflection distance depends on the separation between the two output waveguides, which should be large enough to reduce the crosstalk to acceptable levels. Note the invention is not limited to horizontal deflection, but in other embodiments mechanical deflection directions can be used including vertical and vectorial deflection schemes.

A two-dimensional variational method was used to determine the static electromechanical response of the optical MEMS cantilever. A second-order differential equation describing the balance of Coulombic-induced electrostatic pressure and material elastic restoration pressure was iteratively solved within a prescribed error margin to determine the deformation of the cantilever during electrostatic distributed loading.

Figure 2:
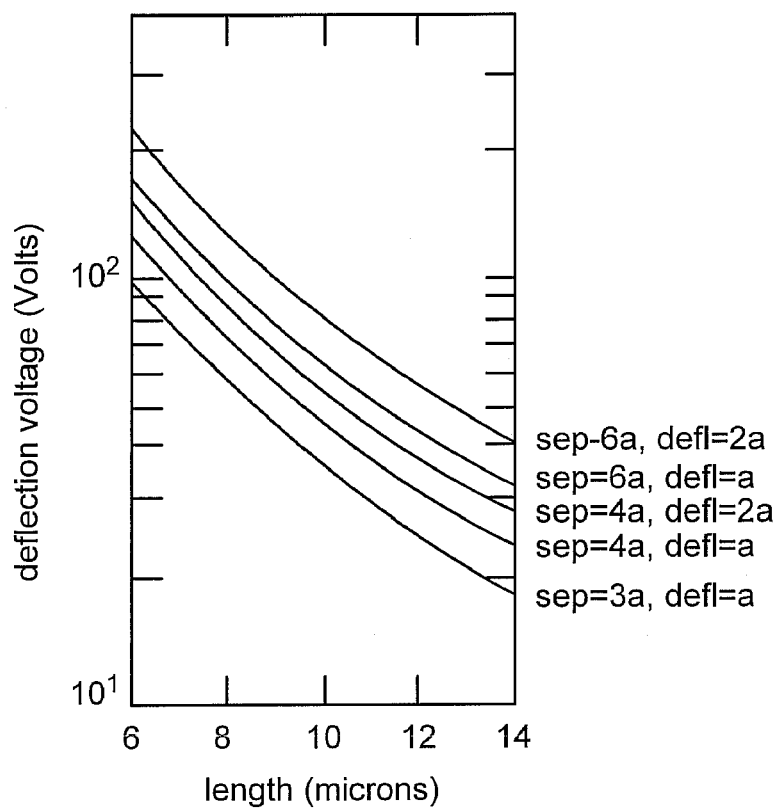
FIG. 2 is a graph demonstrating Voltage required to deflect a GaAs cantilever waveguide as a function of cantilever length for various edge-to-edge separation distances between waveguide and electrode (sep) and distances of deflection (defl)

FIG. 2 shows the deflection voltage as a function of cantilever length for typical electrode-waveguide separations and deflection distances. The voltage decreases rapidly with cantilever length, falling, for example, within the readily achievable range of 20-40 V for a length of 14 µm. Selection of an optimal cantilever length involves the balancing of several design considerations, since increasing the length will tend to both decrease the response time of the switch and increase the complexity of fabrication (due to stiction between the waveguide and the underlying substrate during the release process). The resonant frequency of the cantilever ranges from 1 MHz for a length of 15 µm to 8 MHz for a length of 5 µm. The switch is intended to operate well below the resonant frequency.

Figure 3:
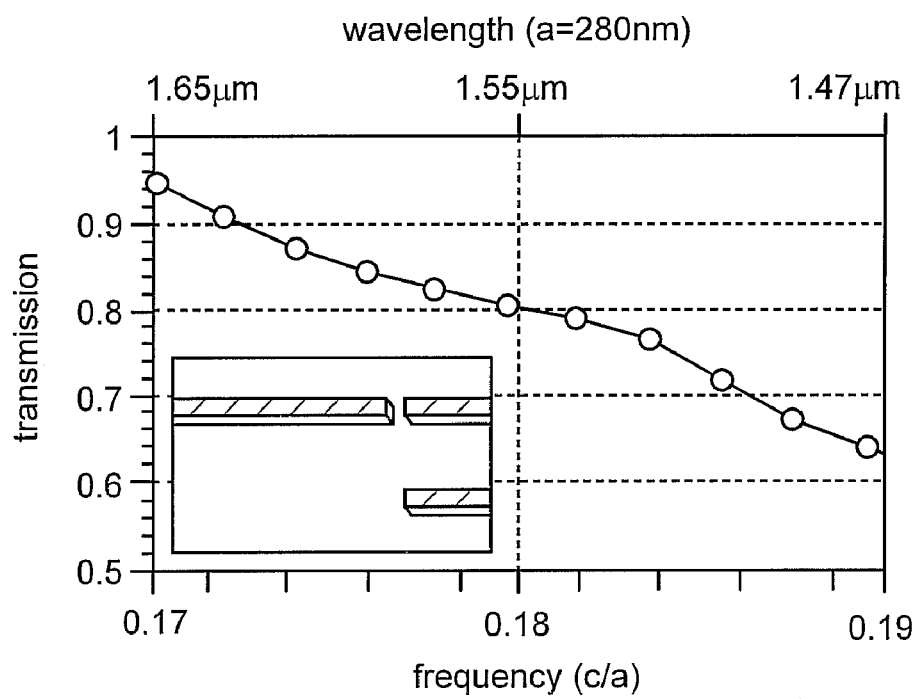
FIG. 3 is graph demonstrating the transmission as a function of frequency for the butt-coupler device geometry.

The transmission is calculated for both designs pf FIG. 1 using three-dimensional (3-D) full-vectorial finite-difference time-domain (FDTD) simulations of Maxwell's equations with perfectly matched layer boundary regions. FIG. 3 shows the transmission as a function of frequency in the butt-coupled layout. The frequency is given in units of c/a, where c is the speed of light and a is the waveguide width. The plot shows corresponding wavelengths in micrometers for a choice of a=280 nm. The width of the air gap was taken to be (90 nm), a conservative estimate of the experimentally achievable value. The transmission decreases as a function of increasing frequency (decreasing wavelength) and is identical for both polarizations, with a transmission of 80% at (1.55 µm). The two polarizations correspond to electromagnetic modes that are even (transverse electric-like) or odd (transverse magnetic) with respect to the horizontal midplane of the structure.) The reflection increases monotonically as a function of frequency from a value of 1% at a frequency of 0.17 c/a to 6% at 0.19 c/a. The remainder of the loss is due to radiation.

For a fixed wavelength, transmission can be increased by making the waveguide narrower, as can be seen from FIG. 3. Attention should be focused on the lower axis (frequency) since the upper axis (wavelength) is only valid for a particular choice of a. The transmission increases with decreasing $v_0$, where $v_0$ is the dimensionless frequency given by $v=v_0 c/a$. For a fixed physical wavelength λ, the corresponding value of a is given by $a=v_0 \lambda$. Thus, for $v_0=0.17$ and λ=1.55 µm, for example, a=280 nm, and transmission of 95% can be achieved for a gap width of 0.32a=84 nm. In practice, the choice of (a) will involve a tradeoff between the optical and mechanical properties of the cantilever beam and actual fabrication tolerances. Horizontal misalignment between input and output waveguides will reduce the transmission, e.g., for a displacement of 0.26a, the reductions in transmission $\Delta T$: 2.5% over the frequency range shown. An error in the waveguide width a of ±10 nm will result in a $\Delta T$ of ∓10%.

Figure 4A:
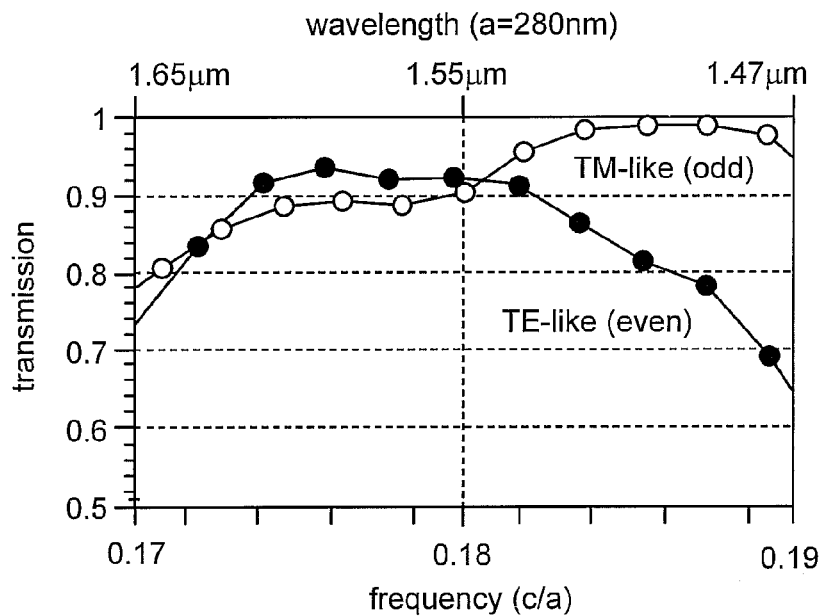
FIG. 4A is a graph demonstrating the transmission as a function of frequency for the parallel-coupler layout.

The parallel-coupler layout design provides an alternate means of increasing the transmission, without reducing the waveguide and/or air gap width. FIG. 4A shows the transmission as a function of frequency for a waveguide center-to-center separation of 2a. The overlap distance of the two waveguides is set to 12a, which is a near-optimal value for a separation of 2a. While the use of the waveguide coupler design introduces polarization dependence into the transmission spectrum, the two transmission curves cross near 0.181 c/a, giving a polarization-independent transmission of 92%. Moreover, the absolute difference in transmission between the two polarizations is less than 0.05 over a 50-nm bandwidth centered at 0.178 c/a. If preserving polarization independence is not essential, single-polarization transmission as high as 98% for the (odd) polarization can be achieved by operating in the 0.184-0.188 c/a frequency range. The reflection was less than 2% for both polarizations in the entire frequency range shown, with significantly lower values at the optimal frequency for transmission.

The optimal overlap length for a given separation can be estimated by means of a simple method that is equivalent to first-order perturbation theory which requires only the frequencies of the guided modes. It is assumed that the optimal overlap length is well approximated by the length required to completely transfer light between two infinitely long parallel waveguides. Coupling between the guides will split the original waveguide mode of frequency ω into states of frequencies ω+Δω/2 and ω−Δω/2, corresponding to in-phase (symmetric) and out-of-phase (antisymmetric) combinations of the single-waveguide modes. If light is originally introduced into one waveguide, the time scale for transfer between the waveguides is $\tau=\pi/\Delta\omega$. To convert to a length scale, is multiplied by the group velocity to get $L=v_g\tau=v_g\pi/\Delta\omega$. The frequency ω is computed by applying a fully vectorial eigenmode solver to find the modes of a parallel waveguide pair.

Figure 4B:
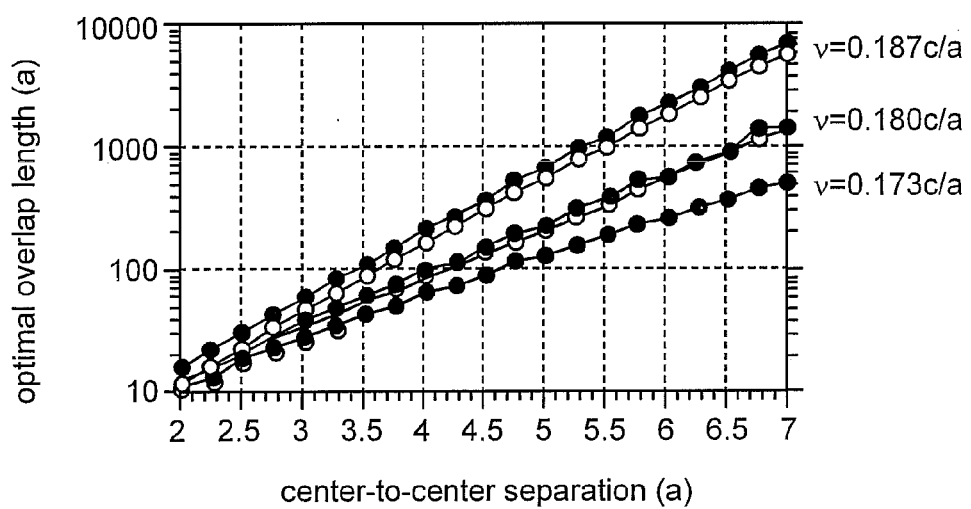
FIG. 4B is a graph demonstrating the optimum overlap length as a function of separation between the parallel waveguides.

From FIG. 4B, it can be seen that the optimal overlap length increases exponentially as a function of waveguide separation, with the rate of increase dependent on the operating frequency. As the frequency increases, the modes become more localized in each waveguide, reducing their overlap and increasing the required length for transfer. If the input and output waveguides suffer a horizontal misalignment, the center-to-center separation is changed and the overlap length is no longer optimal. The severity of the effect is related to the slope of the graph shown in FIG. 4B. From FDTD simulations, it was found that $\Delta T$ was <±10 nm is over the frequency range shown for a change in separation of ∓0.11a. An error in the waveguide widths of ±10 nm results in a change in the transmission on the order of ±10%. The waveguide-coupling picture is also useful for estimating the crosstalk due to the coupling between the two output waveguides. Scattering from the air gap between the input and the output waveguides will also contribute. Given the center-to-center separation between the output waveguides, the crosstalk can be estimated as $C<\sin^2(\pi x/2L)$, where L is the coupling length of FIG. 4A-4B, and x is the overlap distance. Thus, for waveguides separated by 5a (1.40 µm) that run parallel to one another for a distance of 50a (140 µm) after the gap, C<0.15, or −8 dB. The value of the crosstalk as calculated from 3-D FDTD simulations was less than −20 dB. In practice, even lower values of the crosstalk can be achieved by curving the output waveguides apart from one another away from the air trench region.

Although the present invention has been shown and described with respect to several preferred embodiments thereof, various changes, omissions and additions to the form and detail thereof, may be made therein, without departing from the spirit and scope of the invention.

What is claimed is:

1. A nano-electromechanical optical switch comprising:
   an input optical waveguide comprising GaAs that is provided with an optical signal; and
   at least two output optical waveguides comprising GaAs where one of the at least two waveguide is coupled to said input optical waveguide, wherein deflection of said input optical waveguide causes coupling with one of either of said two output optical waveguides so as to allow transmission of said optical signal to one of either of said two output optical waveguides; wherein
   said input and output waveguides reside on a low-index substrate with a switching cantilever region extending over a trench in a low-index material comprising $Al_xO_y$.

2. The nano-electromechanical optical switch of claim 1, wherein said input optical waveguide forms a cantilever beam.

3. A method of performing nano-scaled optical switching comprising:
   providing an input optical waveguide comprising GaAs that is provided with an optical signal;
   providing at least two output optical waveguides where one of said at least two waveguide is coupled to said input optical waveguide, wherein deflection of said input optical waveguide causes coupling with one of either of said two output optical waveguides so as to allow transmission of said optical signal to one of either of said two output optical waveguides; and
   positioning said input and output waveguides to reside on a low-index substrate with a switching cantilever region extending over a trench in a low-index material comprising $Al_xO_y$.

4. The method of claim 3, wherein said input optical waveguide forms a cantilever beam.

5. A cantilever-based optical switch comprising:
   an input optical waveguide that comprising GaAs is provided with an optical signal; and
   at least two output optical waveguides comprising GaAs where one of said at least two waveguide is butt-coupled to said input optical waveguide, wherein deflection of said input optical waveguide causes lateral coupling with one of either of said two output optical waveguides so as to allow transmission of said optical signal to one of either of said two output optical waveguides; wherein
   said input and output waveguides reside on a low-index substrate with a switching cantilever region extending over a trench in a low-index material comprising $Al_xO_y$.

6. The cantilever-based optical switch of claim 5, wherein said input optical waveguide forms a cantilever beam.

* * * * *